(12) United States Patent
Salomons (10) Patent No.: US 8,301,794 B2
(45) Date of Patent: Oct. 30, 2012

(54) MEDIA CONTENT IMPROVED PLAYBACK QUALITY

(75) Inventor: Edwin W. Salomons, Dublin (IE)

(73) Assignee: Microsoft Corporation, Redmond, WA (US)

( * ) Notice: Subject to any disclaimer, the term of this patent is extended or adjusted under 35 U.S.C. 154(b) by 189 days.

(21) Appl. No.: 12/761,677

(22) Filed: Apr. 16, 2010

(65) Prior Publication Data

US 2011/0258336 A1    Oct. 20, 2011

(51) Int. Cl.
G06F 15/16 (2006.01)
(52) U.S. Cl. ..... 709/231; 709/230; 709/238; 705/14.53; 705/14.73
(58) Field of Classification Search .......... 709/230–231; 705/14.53–14.73
See application file for complete search history.

(56) References Cited

U.S. PATENT DOCUMENTS

| | | | |
|---|---|---|---|
| 7,281,034 B1* | 10/2007 | Eyal | 709/219 |
| 7,421,508 B2* | 9/2008 | Hannuksela et al. | 709/231 |
| 7,542,435 B2 | 6/2009 | Leon et al. | |
| 7,783,773 B2* | 8/2010 | Wu et al. | 709/231 |
| 2002/0147979 A1 | 10/2002 | Corson | |
| 2003/0033155 A1* | 2/2003 | Peerson et al. | 705/1 |
| 2003/0033420 A1* | 2/2003 | Eyal et al. | 709/231 |
| 2004/0199657 A1* | 10/2004 | Eyal et al. | 709/231 |
| 2005/0076136 A1 | 4/2005 | Cho et al. | |
| 2005/0262265 A1 | 11/2005 | Ohtsuka | |
| 2006/0184697 A1 | 8/2006 | Virdi et al. | |
| 2006/0200577 A1* | 9/2006 | Park | 709/231 |
| 2007/0011343 A1 | 1/2007 | Davis et al. | |
| 2007/0086521 A1 | 4/2007 | Wang et al. | |
| 2007/0130597 A1* | 6/2007 | Parker et al. | 725/94 |
| 2007/0220163 A1* | 9/2007 | Khouderchah et al. | 709/231 |
| 2008/0022005 A1 | 1/2008 | Wu et al. | |
| 2008/0133767 A1 | 6/2008 | Birrer et al. | |
| 2008/0294789 A1* | 11/2008 | Nassor et al. | 709/231 |
| 2008/0310814 A1* | 12/2008 | Bowra et al. | 386/46 |
| 2009/0164655 A1* | 6/2009 | Pettersson et al. | 709/231 |
| 2009/0300204 A1 | 12/2009 | Zhang et al. | |
| 2010/0010814 A1* | 1/2010 | Patel | 704/257 |
| 2010/0030908 A1* | 2/2010 | Courtemanche et al. | 709/231 |
| 2010/0046927 A1* | 2/2010 | Manthoulis | 386/124 |
| 2010/0049699 A1* | 2/2010 | Benschoter et al. | 707/3 |

(Continued)

OTHER PUBLICATIONS

"Microsoft Smooth Streaming Provides True High-Definition Video Delivery", Retrieved at <<http://www.microsoft.com/presspass/press/2009/apr09/04-20SmoothStreamingPR.mspx >>, Apr. 20, 2009, pp. 3.

(Continued)

*Primary Examiner* — Wing Chan
*Assistant Examiner* — Razu Miah
(74) *Attorney, Agent, or Firm* — Wolfe-SBMC (57) ABSTRACT

Media content improved playback quality is described. In embodiments, a media content playback system stores segments of a media asset in a memory device, where the segments are stored as non-consecutive data that correlates to at least some of the media asset when the segments are downloaded from one or more media content sources. A data load manager is implemented to project when a content navigation input will be received that causes non-linear playback of the media asset. The data load manager can then estimate, for each segment of the media asset, when each segment will be played back based on the projected content navigation input. The data load manager determines a next segment of the media asset to download and store based on estimates of when each segment will be played back.

15 Claims, 7 Drawing Sheets

U.S. PATENT DOCUMENTS

2010/0169808 A1* 7/2010 Yu et al. .................. 715/764
2010/0172498 A1* 7/2010 Malcolm et al. ............. 380/237

OTHER PUBLICATIONS

Zambelli, Alex., "IIS Smooth Streaming Technical Overview", Retrieved at <<http://download.microsoft.com/download/4/2/4/4247C3AA-7105-4764-A8F9-321CB6C765EB/IIS_Smooth_Streaming_Technical_Overview.pdf>>, Mar. 2009, pp. 1-17.

Daka, Justice., "Mixed Streaming of Video over Wireless Networks", Retrieved at <<http://nsl.csie.nctu.edu.tw/NCTUnsReferences/justice_msc_thesis.pdf>>, Jun. 2007, pp. 114.

Krasic, Charles., "A Framework for Quality-Adaptive Media Streaming: Encode Once—Stream Anywhere", Retrieved at <<http://web.cecs.pdx.edu/~walpole/theses/krasic_phd.pdf>>, Feb. 2004, pp. 194.

"International Search Report", Mailed Date: Dec. 26, 2011, Application No. PCT/US2011/031034, Filed Date: Apr. 4, 2011, pp. 8.

* cited by examiner

MEDIA CONTENT IMPROVED PLAYBACK QUALITY

BACKGROUND

Media content delivery systems, such as Internet-based television systems, are designed to stream video data to a client device when requested by a user for immediate live viewing, or download the video data in advance of when the user may want to watch the video after it has been recorded. In addition, a user can start playback of a video that is still downloading before the download is complete. However, some conventional video data streaming techniques are not able to provide a consistent audio and/or video quality for playback at a client device. For example, current adaptive streaming techniques may download segments of a video over a network from various media content sources at a number of different quality levels, each having a different bandwidth requirement. Due to unpredictable network bandwidth, adaptive streaming download algorithms rely on low quality video segments to maintain playback of a video without perceptible delay to a viewer, although the visual quality during playback may be a noticeable drawback to the viewer.

Inconsistent video quality is primarily due to the unpredictable network bandwidth, as well as variations in the bandwidth that is needed for video data compressed at a constant quality level. These bandwidth variations can be a result of variations in video complexity, such as a relatively high bandwidth for video data that includes complex scenes. For example, an action sequence in a movie that includes motion and/or fast changing scenes adds to the video complexity and increases bandwidth requirements to download segments of the video that includes the complex scenes. In addition, conventional playback systems buffer video data consecutively (e.g., in the order in which it is received) in an attempt to even out the variations in the video quality. However, this technique becomes ineffective when a user initiates non-linear playback of the video data, such as when skipping or jumping between chapters.

SUMMARY

This summary is provided to introduce simplified concepts of media content improved playback quality that are further described below in the Detailed Description. This summary is not intended to identify essential features of the claimed subject matter, nor is it intended for use in determining the scope of the claimed subject matter.

Media content improved playback quality is described. In embodiments, a media content playback system stores segments of multiple, various media assets in a memory device. The segments are stored as non-consecutive data that correlates to at least some of the various media assets when the segments are downloaded from one or more media content sources. A data load manager is implemented to project when a content navigation input will be received that causes non-linear playback of one of the media assets. The data load manager can then estimate, for each segment of the media asset, when each segment will be played back based on the projected content navigation input. The data load manager determines a next segment of the media asset to download and store based on estimates of when each segment will be played back. The data load manager may also determine the next segment of the media asset to download based on a target playback quality of each segment of the media asset.

In embodiments, the data load manager determines the likelihood of receiving content navigation inputs that are initiated by a viewer, takes into account the video complexity of segments of a media asset, and projects the available network bandwidth to determine which segments of the media asset to download next to optimize the probability of providing a consistent media playback quality. A content navigation input may be received as an input to jump advance in the media asset, a fast-forward advance of the media asset, a jump back in the media asset, a rewind of the media asset, or a change to stop playback of the media asset and start playback of a different media asset.

In other embodiments, segments of a media asset that would be subject to bandwidth constraints if downloaded during playback of the media asset can be preloaded (e.g., downloaded and stored) before playback of the media asset. A certain amount of network bandwidth is presumed available during playback of the media asset, and the segments of the media asset that are preloaded correspond to the delta between the required and available bandwidth to maintain a target playback quality. The data load manager can determine the segments of the media asset to preload based on load models that are generated for each segment of the media asset, where a load model includes an improvement value by which each of the segments are ranked to determine a next best segment to download. The segments of the media asset that may be subject to bandwidth constraints are the segments at a beginning of the media asset, or segments of the media asset that are resource intensive to download. Additionally, the media content playback system can download and overwrite segments of the media asset that are stored by the memory device to improve a display quality of the media asset for playback. Additionally, segments of the media asset that are unlikely to be played back can be identified and deleted from the memory device.

BRIEF DESCRIPTION OF THE DRAWINGS

Embodiments of media content improved playback quality are described with reference to the following drawings. The same numbers are used throughout the drawings to reference like features and components.

DETAILED DESCRIPTION

Media content improved playback quality is described. Embodiments provide that segments of a media asset which are not likely to be available for download due to insufficient network bandwidth are downloaded and available prior to playback of the media asset for an improved user experience, and to optimize the overall display quality when the media asset is rendered for playback and viewing. In addition, a media content playback system configured as any type of client device can utilize local storage at the client device to store non-consecutive segments of various media assets.

In embodiments, a load algorithm of the media content playback system can project or determine the likelihood of a content navigation input being received during playback of a media asset. The load algorithm can estimate, for each segment of the media asset, when each segment will be played back based on projected content navigation inputs. The load algorithm then determines a next segment of the media asset to download based on the estimates of when each segment will be played back. Additionally, a data load manager that implements the load algorithm can determine segments of the media asset to preload based on load models that are generated for each segment of the media asset, where a load model includes an improvement value by which each of the segments are ranked to determine a next best segment to download.

While features and concepts of the described systems and methods for media content improved playback quality can be implemented in any number of different environments, systems, and/or various configurations, embodiments of media content improved playback quality are described in the context of the following example systems and environments.

Figure 1:
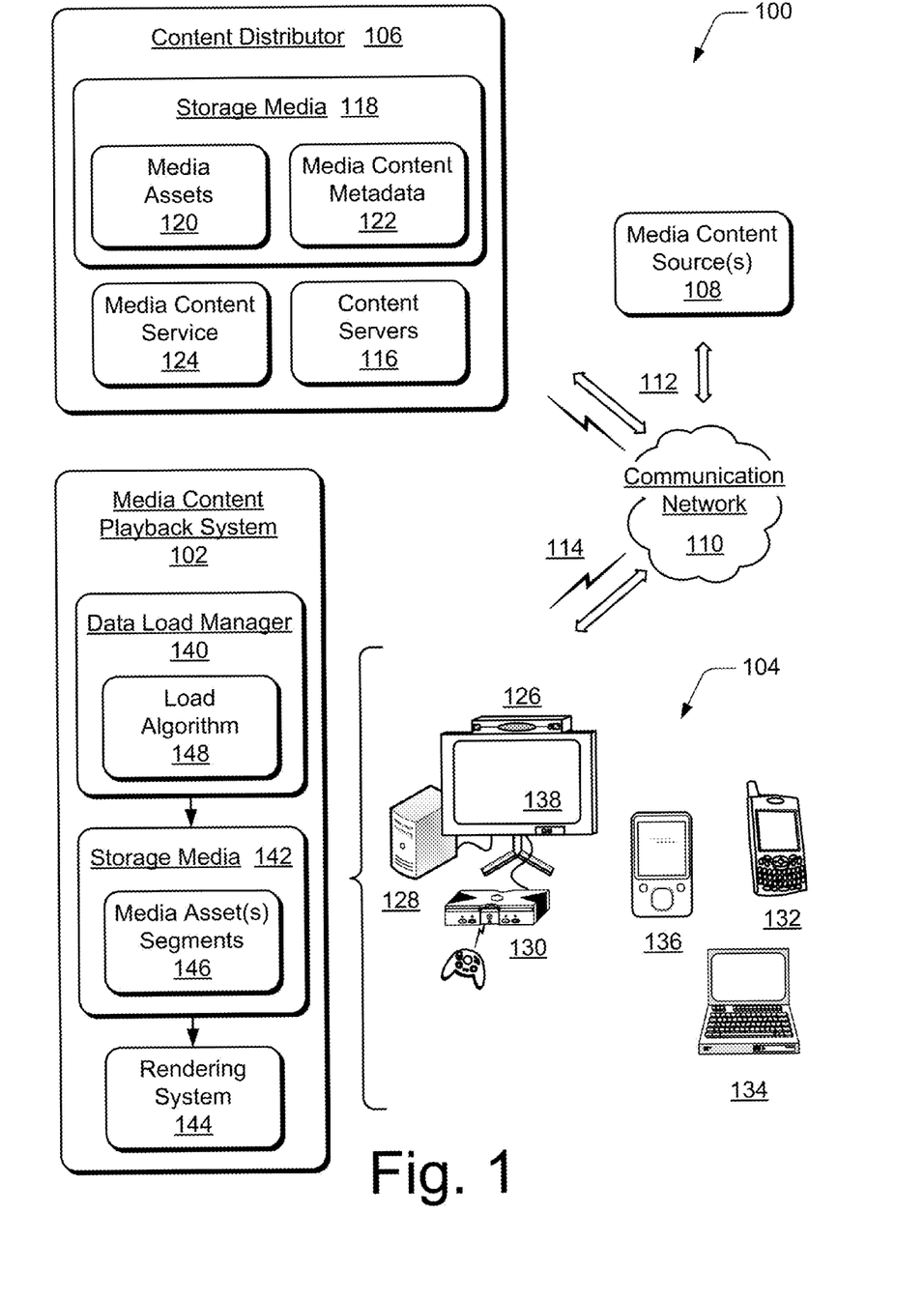
FIG. 1 illustrates an example system in which embodiments of media content improved playback quality can be implemented.

FIG. 1 illustrates an example system 100 in which various embodiments of media content improved playback quality can be implemented. The example system 100 includes a media content playback system 102, which may be configured as any type of client device 104. Some of the various client devices 104 can include wired and/or wireless devices, and may also be referred to as user devices and/or portable devices. The example system 100 also includes a content distributor 106 and/or other media content sources 108 that communicate or otherwise provide media content and data to any number of the various client devices 104 via a communication network 110.

The communication network 110 can be implemented to include a broadcast network, an IP-based network 112, and/or a wireless network 114 that facilitates media asset distribution and data communication between the content distributor 106, the other media content sources 108, and any number of the various client devices. The communication network 110 can also be implemented as part of a media asset distribution system using any type of network topology and/or communication protocol, and can be represented or otherwise implemented as a combination of two or more networks. The communication network 110 may also include a mobile operator network that is managed by a communication service provider, such as a cell-phone provider and/or Internet service provider, to facilitate mobile data and/or voice communications for any type of a wireless device or mobile phone (e.g., cellular, VoIP, Wi-Fi, etc.).

Content distributor 106 can include one or more media content servers 116 that are implemented to communicate, or otherwise distribute, media content and/or other data to any number of the various client devices. In this example system 100, content distributor 106 includes storage media 118 to store or otherwise maintain various media content and data, such as media assets 120 and media content metadata 122. The storage media 118 can be implemented as any type of memory and/or suitable electronic data storage.

The media assets 120 can include any type of audio, video, and/or image data received from any type of media content source or data source. As described throughout, media assets are media content, and media assets can include music (e.g., digital music files of songs), television programming, movies, on-demand media assets, interactive games, network-based applications, and any other audio, video, and/or image data (e.g., to include program guide data, user interface data, advertising content, closed captions data, content metadata, search results and/or recommendations, etc.). A media asset 120 can include various display formats of the media asset, such as a highest quality display format (e.g., a highest quality, high-definition display format) to a lower quality display format (e.g., a lower quality, standard-definition display format), and any other quality of display format along a continuum between the two.

The media content metadata 122 can include any type of identifying criteria, descriptive information, and/or attributes associated with the media assets 120 that describes and/or categorizes the media assets. For example, metadata can include a media asset identifier, title, subject description, a date of production, artistic information, music compilations, and any other types of descriptive information about a particular media asset. Further, metadata can characterize a genre that describes a media asset, such as video content, as being an advertisement, a movie, a comedy show, a sporting event, a news program, a sitcom, a talk show, an action/adventure program, or as any number of other category descriptions.

Content distributor 106 may also include a media content service 124. In various embodiments, the content distributor 106 can be implemented as a subscription-based service from which any of the various client devices 104 can request media assets 120 to download and display for viewing. The media content service 124 is implemented to manage the media asset distribution to the various client devices 104. For example, the media content service 124 can receive a request for a media asset 120 from a client device 104, and communicate or provide segments of the media asset to the client device.

In this example system 100, a client device 104 can be implemented as any one or combination of a television client device 126 (e.g., a television set-top box, a digital video recorder (DVR), etc.), a computer device 128, a gaming system 130, an appliance device, an electronic device, and/or as any other type of client device or user device that may be implemented to receive media content in any form of audio, video, and/or image data. The various client devices 104 can also include wireless devices implemented to receive and/or communicate wireless data, such as any one or combination of a mobile phone 132 (e.g., cellular, VoIP, WiFi, etc.), a portable computer device 134, a media device 136 (e.g., a personal media player, portable media player, etc.), and/or any other wireless device that can receive media content in any form of audio, video, and/or image data. A client system can include a respective client device and display device 138 that together render or playback any form of audio, video, and/or image media content and media assets. The display device 138 can be implemented as any type of a television, high definition television (HDTV), LCD, or similar display system.

Any of the various client devices 104 can be configured as the media content playback system 102 and implemented with one or more processors, communication components, memory components, signal processing and control circuits, and a media content rendering system. Further, any of the client devices 104 can be implemented with any number and combination of differing components as further described with reference to the example device shown in FIG. 8. A client device may also be associated with a user (i.e., a person) and/or an entity that operates the device such that a client device describes logical devices that include users, software, and/or a combination of devices.

In this example system 100, the media content playback system 102 includes a data load manager 140, storage media 142, and a rendering system 144. The storage media 142 can be implemented as any type of memory device to store segments 146 of various media assets. The data load manager 140 includes a load algorithm 148 that can be implemented as computer-executable instructions and executed by one or more processors to implement the various embodiments and/or features described herein.

Figure 2:
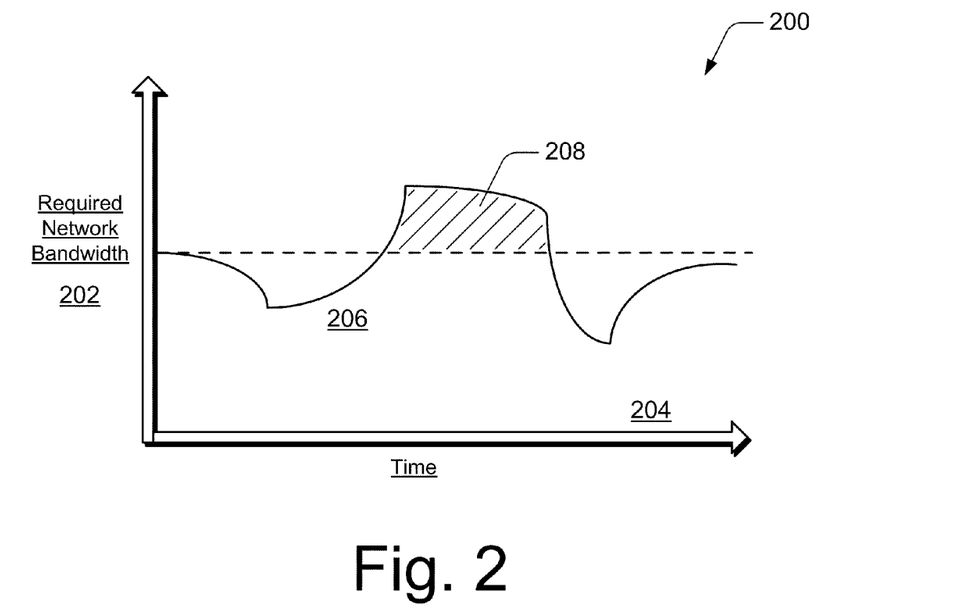
FIG. 2 illustrates an example graph of required network bandwidth over time to stream segments of media content at a selected display quality level.

In embodiments of algorithm implementation, the load algorithm 148 selects a constant display quality level of a media asset from which segment sizes of the media asset are determinable (because segment sizes can include more or less data for different display quality levels of media content). Assuming a constant level of available network bandwidth, the load algorithm 148 determines the required network bandwidth over time to stream the media content at the selected display quality level. FIG. 2 illustrates an example graph 200 of the required network bandwidth 202 over time 204 to stream the segments 206 of the media content at the selected display quality level. For example, each segment may be five seconds of the media asset, and the segment sizes change over the playback time, such as for complex video that has large data segments for the same time period.

For the segments of the media asset in which the required network bandwidth exceeds the assumed available bandwidth, a subset of the segments are selected to preload such that the network bandwidth required to stream the remaining segments of the media asset are at or below the assumed available bandwidth. For example, a segment 208 of the media asset exceeds the required network bandwidth 202, and the segment 208 can be preloaded, such as in the storage media 142 of the media content playback system 102.

Alternatively or in addition, segments of the media asset can be preloaded in a file that is distributed out-of-band from the content (e.g., via an overnight pre-emptive download, a broadcast, or an optical disk). During subsequent live streaming of the media asset, the preload file is used to assist when loading the media asset. This technique may also be implemented in a network architecture, such as by storing the preloaded segments of the media content at the content distributor 106 and serving the preloaded segments from the network storage location. In this embodiment, the preload file of the preloaded segments are cached in a local storage and/or for quick access in network storage, while the bulk of the segments for the media asset are stored centrally.

In an alternate embodiment of algorithm implementation, the load algorithm 148 is implemented based on an availability of a particular buffer size to preload the segments of the media asset, which evens out the network bandwidth. This technique has the effect of applying a low pass filter to the example graph 200 that is shown in FIG. 2, and reduces the number of segments of the media asset that are preloaded. In another alternate embodiment of algorithm implementation, the buffer to preload the segments of the media asset is reset at likely access points in the media asset, such as at chapter points in a video. This technique increases the likelihood of preloading the segments of the media asset that occur shortly after the access points in the media asset.

In various embodiments, the load algorithm 148 is implemented to determine the most likely segments of a media asset to download for an improved user experience, such as to provide a consistent display quality when the media asset is rendered for playback and viewing. In embodiments, the load algorithm 148 is implemented to determine the likelihood of receiving content navigation inputs that are initiated by a viewer. The load algorithm also takes into account the video complexity of segments of a media asset, and projects the available network bandwidth to determine which segments of the media asset to download next to optimize the probability of providing a consistent media playback quality. For example, the load algorithm 148 may determine the likelihood of receiving a jump advance in a media asset when a particular viewer typically jumps past commercials while viewing a video. In other instances, a viewer at the television client device 126 may initiate any type of content navigation input, such as a jump advance in a media asset, a fast-forward advance of the media asset, or a change to stop playback of the media asset and start playback of different media asset.

The load algorithm 148 is also implemented to estimate, for each segment of a media asset, when each segment will be played back based on the projection of receiving content navigation inputs. The load algorithm 148 can then determine a next segment of the media asset to download and store based on the estimates of when each segment will be played back. The load algorithm 148 may also determine the next segment of the media asset to download based on a target playback quality of each segment of the media asset. In embodiments, the load algorithm 148 determines segments of the media asset to preload (e.g., download and store) based on load models that are generated for each segment of the media asset. The load algorithm 148 can generate a load model for each segment, and a load model includes an improvement value by which each of the segments are ranked to determine the next best segment to download. The segments of a media asset that are determined for preload can be downloaded to improve the target playback quality of the segments.

It should be noted that when a content navigation input is projected or determined as likely to be received, such as an advance or jump ahead in a media asset, the one or more segments of the media asset just after the jump are not necessarily determined as the segments to download next. If the segments of the media asset are not overly complex and/or network bandwidth is available to download the segments during playback of the media asset, while maintaining the target display quality, then the load algorithm 148 can determine to next download other segments of the media asset. For example, the next segments of the media asset that are determined for download may be the segments of a complex video scene that is estimated for playback approximately one-minute past where the jump advance resumes the media asset for viewing. The load algorithm 148 can also evaluate buffer fullness and determine segments of the media asset to download based on the load models that are generated for each segment of the media asset to optimize the display quality for the most likely user inputs and largest possible improvements.

The load algorithm 148 enables the data load manager 140 to provide an approximately consistent media quality level (e.g., at the target display quality). The data load manager 140 utilizes the additional storage media 142 (e.g., in addition to an optional smaller-capacity buffer) to recursively maximize the minimum amount of media time available at any point in the remaining playback time of a media asset to prevent playback issues, such as when the network bandwidth is unexpectedly reduced. In embodiments, the data load manager 140 can download the segments 146 of media assets that may be subject to bandwidth constraints, which may prevent the segments of the media asset to be downloaded at the target playback quality. For example, the segments of a media asset that may be subject to bandwidth constraints include the segments at a beginning of the media asset, or segments of the media asset that are resource intensive to download. These segments of 146 a media asset can be download and stored by the storage media 142 at the media content playback system 102.

In embodiments, the segments of the media assets are indexed based on which segment or segments will provide the most likely improved user experience. An improvement value I indicates an improvement of the user experience if a segment is available at a particular time t for a system state s for a probability P of the system state s occurring at the particular time t. The data chunk of a segment that is selected and loaded next for rendering is the data chunk described by a function f (P,I) when maximized. The load algorithm 148 can recursively determine or calculate the function f (P,I) over the total remaining playback time of a media asset by using information about which segments have already been downloaded and stored, quality and/or data size values for each of the segments, and a projected value for the available network bandwidth.

In the media content playback system 102, the segment loader process (e.g., implemented by the data load manager 140) and the playback process (e.g., implemented by the rendering system 144) are independent processes of the playback system. The data load manager 140 provides that the segments of a media asset needed for playback are available at a client device, and the load algorithm 148 of the data load manager optimizes the likeliness of achieving a consistent playback quality even when user inputs are received, such as a content navigation input. The load algorithm 148 derives the load models for each segment of a media asset, and the load models indicate a probability of playback occurrence for each segment.

When determining the segments of the media assets that have a high probability of playback, the load algorithm 148 can take into account optimization criteria. For example, the optimization criteria includes determining the availability of various segments of the media assets to download, and whether the segments will be readily available when needed and at a high bit rate, or whether the segments will be slow to download such as due to bandwidth constraints from the download source. An optimization criteria may also take into account the relative availability of media asset segments in a peer-to-peer environment. Specific segments of a media asset can be downloaded and stored assuming that a certain amount of network bandwidth will be available whenever a viewer initiates to playback a media asset. The bandwidth available during playback can be used to augment the stored segments of a media asset, such as the jump points and the more complex scenes in the media asset. This provides for limiting the amount of storage space needed to store segments of a media asset while still providing a consistent playback quality of the media asset.

In an implementation, a broadcast technology may be utilized to broadcast to client devices only the complex segments of a large group of media assets instead of preloading these segments over the IP Network. The operator could broadcast a stream of data chunks and the client devices would receive and store a subset of those broadcasted data chunks based on expected available IP bandwidth at playback. The load algorithm 148 at a client device (e.g., a media content playback system) can estimate and determine which data chunks to preload to provide a constant quality playback experience over IP.

In another embodiment, the load algorithm 148 can determine segments 146 of a media asset stored by the storage media 142 that can be overwritten to improve a display quality of the media asset for playback. For example, stored segments can be overwritten with higher quality versions of the segments to improve the display quality of a media asset. The data load manager 140 can download and overwrite the segments 146 of the media asset with improved segments to improve the display quality of the media asset for playback.

In another embodiment, the load algorithm 148 can determine which of the segments 146 of a media asset to delete from the storage media 142, such as segments that are unlikely to be played back. For example, a viewer may have initiated a content navigation input to jump advance while viewing a media asset, and segments of the media asset that were skipped over may be identified for deletion from the storage media.

Figure 3:
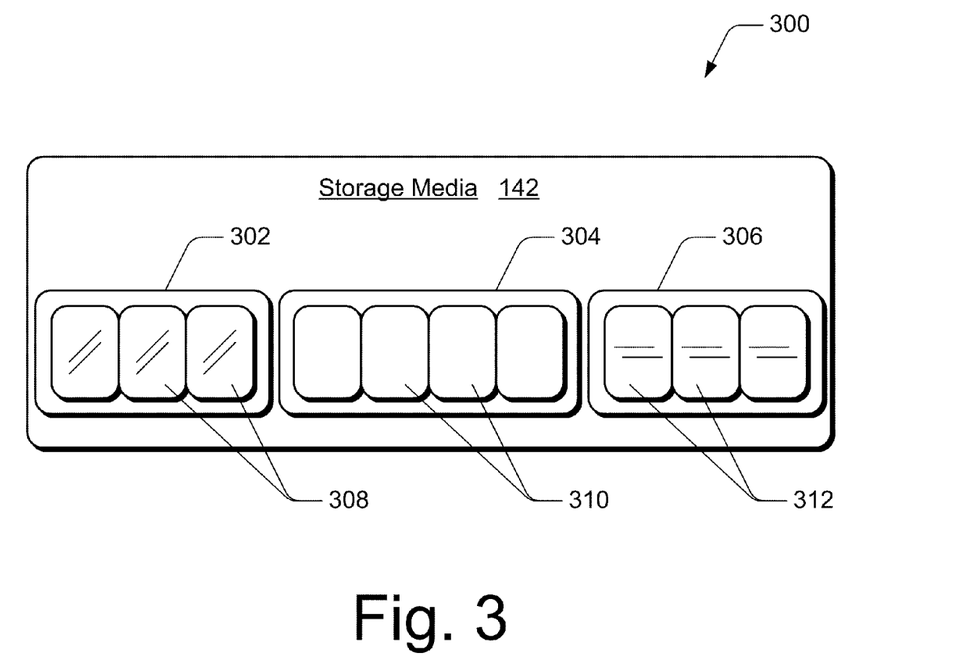
FIG. 3 illustrates an example of non-consecutive storage of data chunks for segments of media assets.

FIG. 3 illustrates an example 300 of non-consecutive storage of data for segments of media assets in various embodiments of media content improved playback quality. In this example 300, the storage media at the media content playback system 102, as described with reference to FIG. 1, includes segments of various media assets, such as media asset segment 302, media asset segment 304, and media asset segment 306. These media asset segments may all be associated with different media assets, all associated with the same media asset, and/or some combination thereof. For example, media asset segments 302 and 306 may be associated with the same media asset, while media asset segment 304 is associated with a different media asset. The segments of the media assets each include any number of data chunks, such as data chunks 308 in media asset segment 302, data chunks 310 in media asset segment 304, and data chunks 312 in media asset segment 306. The data for a particular media asset can be stored out of playback order (e.g., in a non-consecutive order), and the load algorithm 148 determines which data to read based on the optimization criteria.

Figure 4:
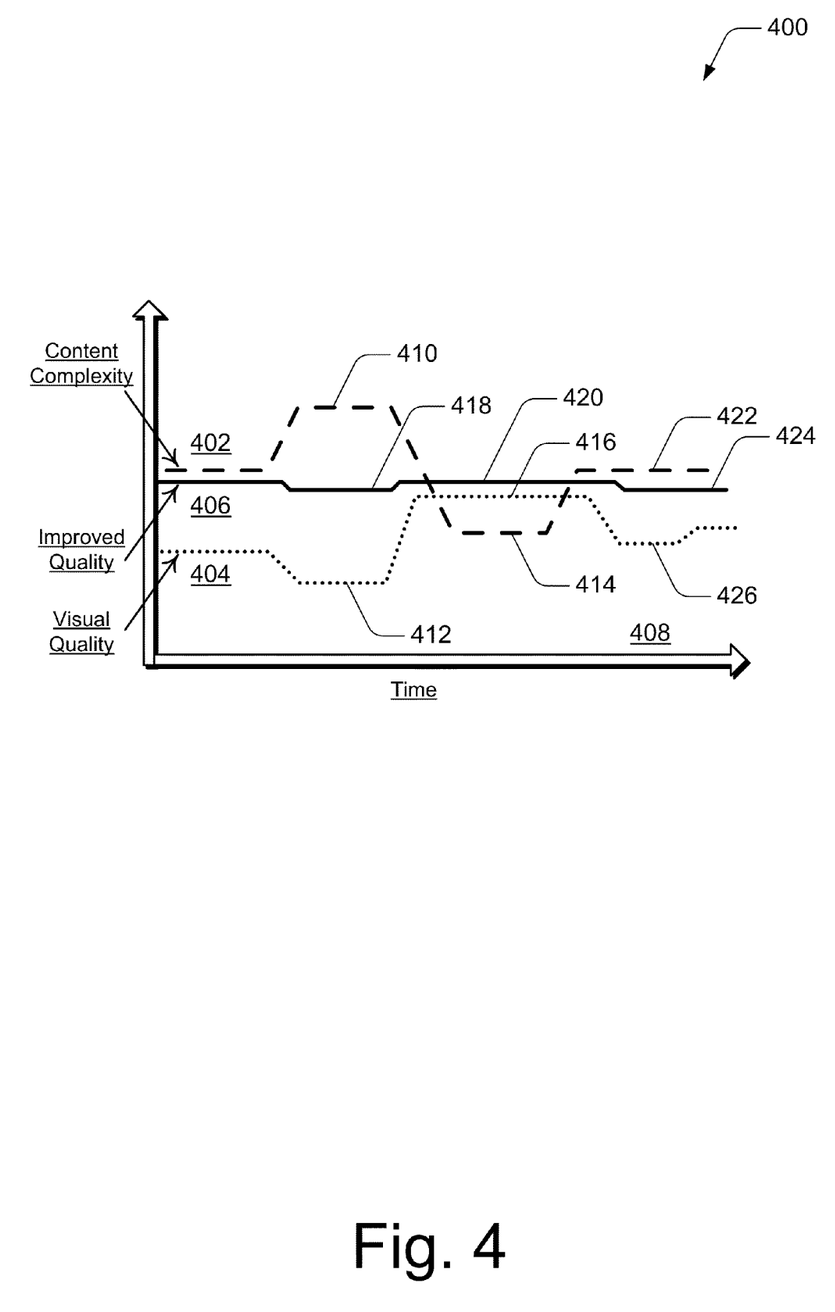
FIG. 4 illustrates media content improved playback quality in accordance with one or more embodiments.

FIG. 4 illustrates an example of media content improved playback quality in a graph 400 that includes indications of content complexity 402, visual quality 404, and an improved quality 406 over time 408. The graph 400 illustrates that as content complexity 402 varies over time 408, the visual quality 404 of a media asset that is played back for viewing can also vary. As described above, a conventional video data streaming technique may not provide a consistent video quality for playback at a client device due to unpredictable network bandwidth and the additional video data needed for complex scenes in a media asset. For example, as the content complexity increases at 410 (or for a sudden drop of network bandwidth), the visual quality decreases at 412. Subsequently, when the content complexity decreases at 414, the visual quality improves at 416.

The graph 400 also illustrates the improved quality 406 in accordance with embodiments of media content improved playback quality as described herein. For example, as the content complexity increases at 410, the improved quality may decrease slightly at 418 (or not at all), unlike the conventional visual quality that decreases at 412. Similarly, when the content complexity decreases at 414, the improved quality remains approximately constant at 420. Subsequently, when the content complexity again increases at 422, the improved quality continues approximately constant at 424, whereas the conventional visual quality may decrease at 426.

Figure 5:
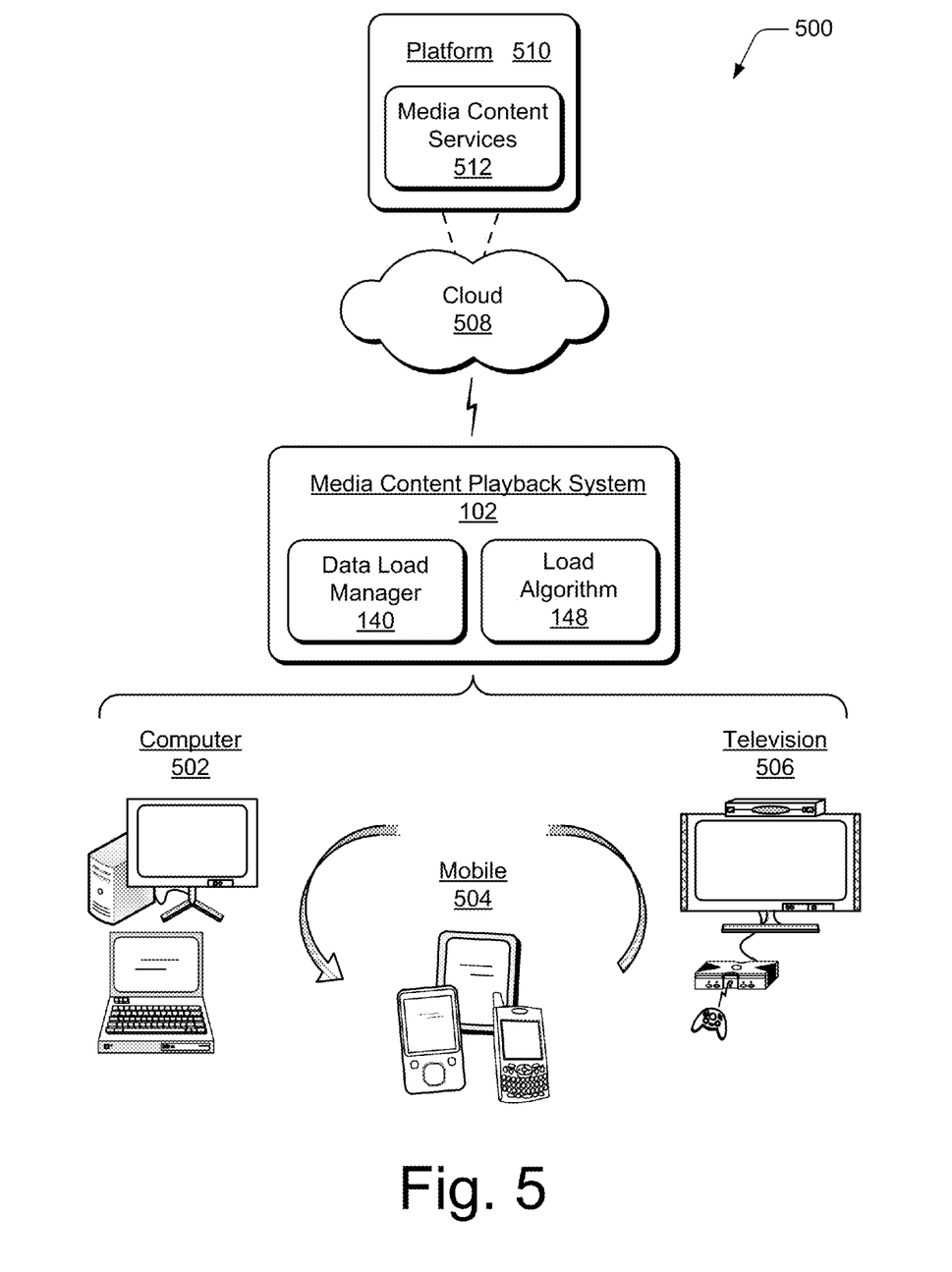
FIG. 5 illustrates an example system with multiple devices that can implement various embodiments of media content improved playback quality for a seamless user experience in ubiquitous environments.

FIG. 5 illustrates an example system 500 that includes the media content playback system 102 as described with reference to FIG. 1. The example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the media content playback system 102 may assume a variety of different configurations, such as for computer 502, mobile 504, and television 506 uses. Each of these configurations includes devices that may have generally different constructs and capabilities, and thus the media content playback system 102 may be configured according to one or more of the different device classes. For instance, the media content playback system 102 may be implemented as the computer 502 class of a device that includes a personal computer, desktop computer, a multi-screen computer, laptop computer, netbook, and so on.

The media content playback system 102 may also be implemented as the mobile 504 class of device that includes mobile devices, such as a mobile phone, portable music player, portable gaming device, a tablet computer, a multi-screen computer, and so on. The media content playback system 102 may also be implemented as the television 506 class of device that includes devices having or connected to generally larger screens in casual viewing environments. These devices include televisions, set-top boxes, gaming consoles, and so on. The techniques described herein may be supported by these various configurations of the media content playback system 102 and are not limited to the specific examples of media content improved playback quality described herein.

The cloud 508 includes and/or is representative of a platform 510 for media content services 512. The platform 510 abstracts underlying functionality of hardware (e.g., servers) and software resources of the cloud 508. The media content services 512 may include applications and/or data that can be utilized while computer processing is executed on servers that are remote from the media content playback system 102. Media content services 512 can be provided as a service over the Internet and/or through a subscriber network, such as a cellular or WiFi network.

The platform 510 may abstract resources and functions to connect the media content playback system 102 with other computing devices. The platform 510 may also serve to abstract scaling of resources to provide a corresponding level of scale to encountered demand for the media content services 512 that are implemented via the platform 510. Accordingly, in an interconnected device embodiment, implementation of functionality of the data load manager 140 and/or the load algorithm 148 may be distributed throughout the system 500. For example, the data load manager 140 and/or the load algorithm 148 may be implemented in part on the media content playback system 102 as well as via the platform 510 that abstracts the functionality of the cloud 508.

Example methods 600 and 700 are described with reference to respective FIGS. 6 and 7 in accordance with one or more embodiments of media content improved playback quality. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 6:
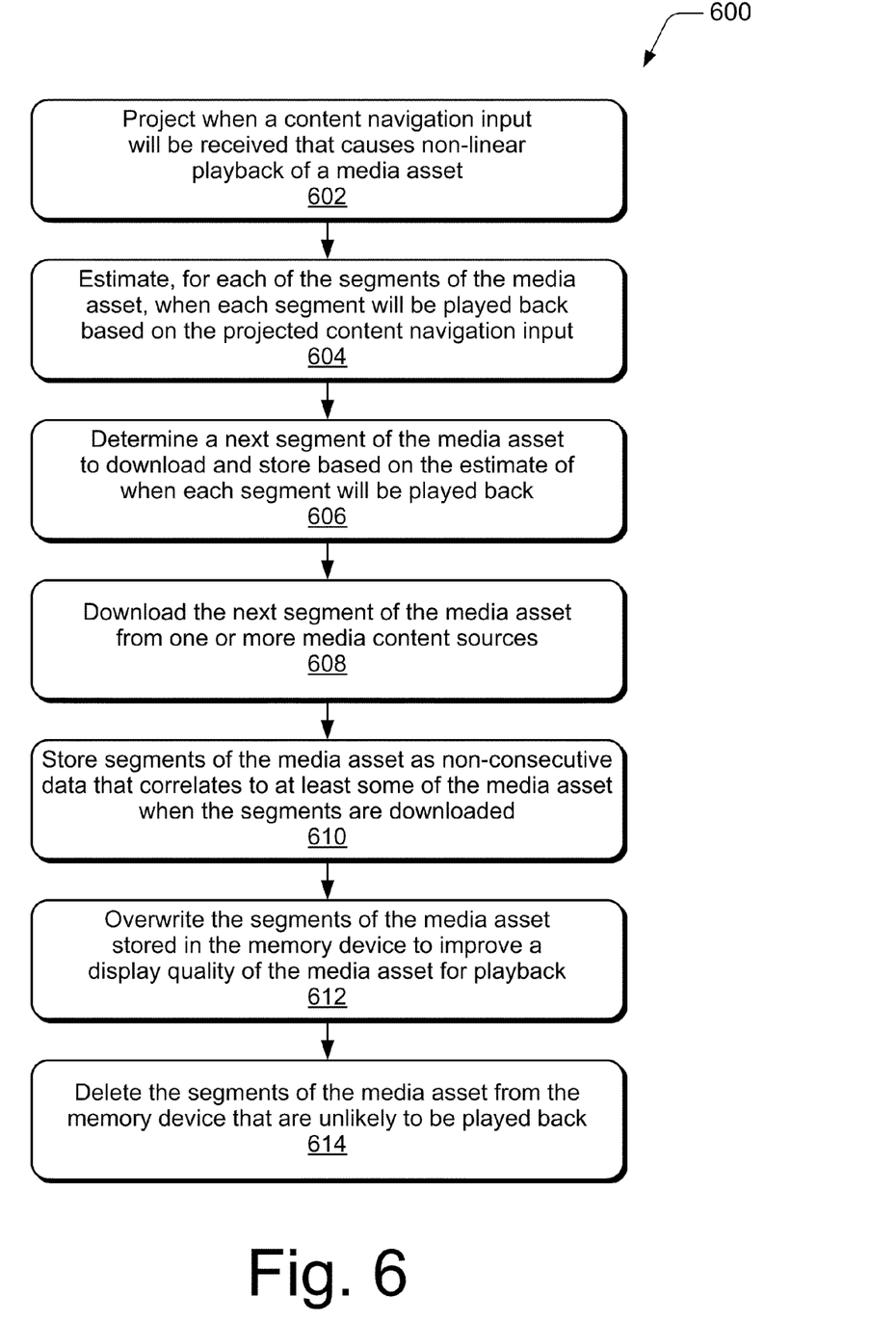
FIG. 6 illustrates example method(s) of media content improved playback quality in accordance with one or more embodiments.

FIG. 6 illustrates example method(s) 600 of media content improved playback quality, and is described with reference to a media content playback system. The order in which the method blocks are described are not intended to be construed as a limitation, and any number of the described method blocks can be combined in any order to implement a method, or an alternate method.

At block 602, project when a content navigation input will be received that causes non-linear playback of the media asset. For example, the load algorithm 148 of the media content playback system 102 projects, or determines, the likelihood of when content navigation inputs will be received when initiated by a viewer. In one instance, the load algorithm 148 determines the likelihood of receiving a jump advance in a media asset when a particular viewer typically jumps past commercials while viewing a video. In other instances, any type of content navigation input may be received, such as a jump advance in a media asset, a fast forward advance of the media asset, or a change to stop playback of the media asset and start playback of different media asset.

At block 604, estimate, for each of the segments of the media asset, when each segment will be played back based on the projected content navigation input. For example, the load algorithm 148 estimates, for each segment of a media asset, when each segment will be played back based on the projection of receiving the content navigation inputs.

At block 606, a next segment of the media asset is determined to download and store based on the estimate of when each segment will be played back. For example, the load algorithm 148 determines a next segment of the media asset to download and store based on the estimates of when each segment will be played back. The load algorithm also takes into account the video complexity of the segments of the media asset, and projects the available network bandwidth to determine which segments of the media asset to download next to optimize the probability of providing a consistent media playback quality.

At block 608, the next segment of the media asset is downloaded from one or more media content sources. For example, the data load manager 140 at the media content playback system 102 downloads the next segment, or segments, of the media asset from any of the various media content sources 108.

At block 610, store in a memory device, segments of a media asset are stored as non-consecutive data that correlates to at least some of the media asset when the segments are downloaded. For example, the storage media 142 at the media content playback system 102 stores segments 146 of multiple, various media assets and the segments are stored as non-consecutive data that correlates to at least some of the various media assets. For example, the media asset segments shown in FIG. 2 may all be associated with different media assets, all associated with the same media asset, and/or some combination thereof.

At block 612, overwrite the segments of the media asset stored in the memory device to improve a display quality of the media asset for playback. For example, the load algorithm 148 of the data load manager 140 determines segments 146 of a media asset stored by the storage media 142 that can be overwritten to improve a display quality of the media asset for playback. The stored segments are overwritten with higher quality versions of the segments to improve the display quality of the media asset.

At block 614, segments of the media asset that are unlikely to be played back are deleted from the memory device. For example, the load algorithm 148 determines which of the segments 146 of a media asset to delete from the storage media 142, such as segments that are unlikely to be played back. For example, a viewer may have initiated a content navigation input to jump advance while viewing a media asset, and segments of the media asset that were skipped over may be identified for deletion from the storage media. The data load manager 140 can then delete the unused segments from the storage media.

Figure 7:
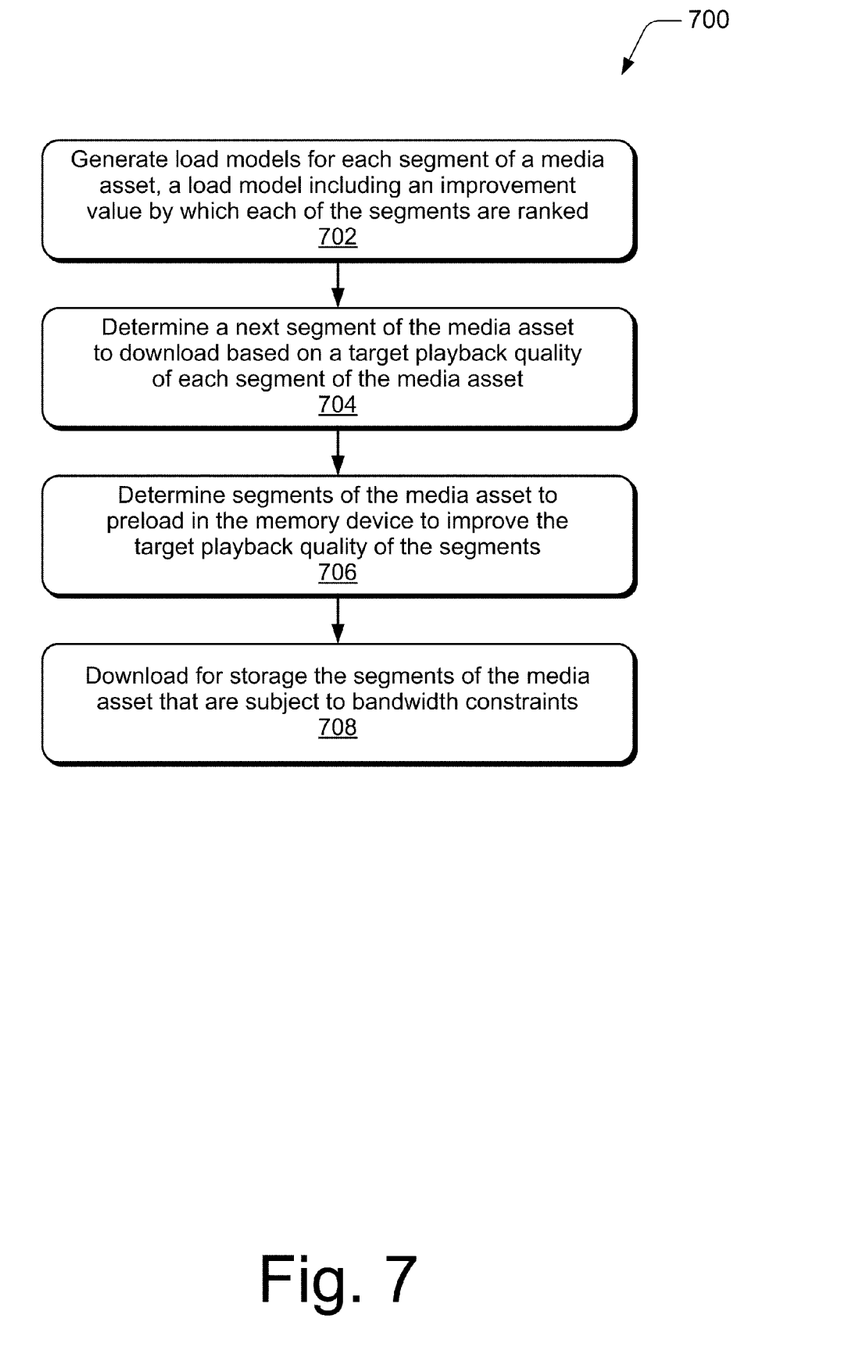
FIG. 7 illustrates additional example method(s) of media content improved playback quality in accordance with one or more embodiments.

FIG. 7 illustrates example method(s) 700 of media content improved playback quality, and is described with reference to a load algorithm. The order in which the method blocks are described are not intended to be construed as a limitation, and any number of the described method blocks can be combined in any order to implement a method, or an alternate method. Additionally, any one or combination of the method blocks described with reference to method 700 may be combined with any one or combination of the method blocks described with reference to method 500.

At block 702, generate load models for each segment of the media asset, where a load model includes an improvement value by which each of the segments are ranked to determine a next best segment to download. For example, the load algorithm 148 of the data load manager 140 at the media content playback system 102 generates a load model for each segment of a media asset, and a load model includes an improvement value by which each of the segments are ranked to determine the next best segment to download.

At block 704, determine a next segment of the media asset to download based on a target playback quality of each segment of the media asset. For example, the load algorithm 148 determines the next segment of the media asset to download based on a target playback quality of each segment of the media asset. At block 706, segments of the media asset are determined to preload in the memory device to improve the target playback quality of the segments. For example, the load algorithm 148 determines segments of the media asset to preload based on the load models that are generated for each segment of the media asset.

At block 708, segments of a media asset are downloaded that are subject to bandwidth constraints. For example, the data load manager 140 at the media content playback system 102 downloads the segments 146 of various media assets that are subject to bandwidth constraints. The segments of a media asset that may be subject to bandwidth constraints include segments at a beginning of the media asset, or segments of the media asset that are resource intensive to download.

Figure 8:
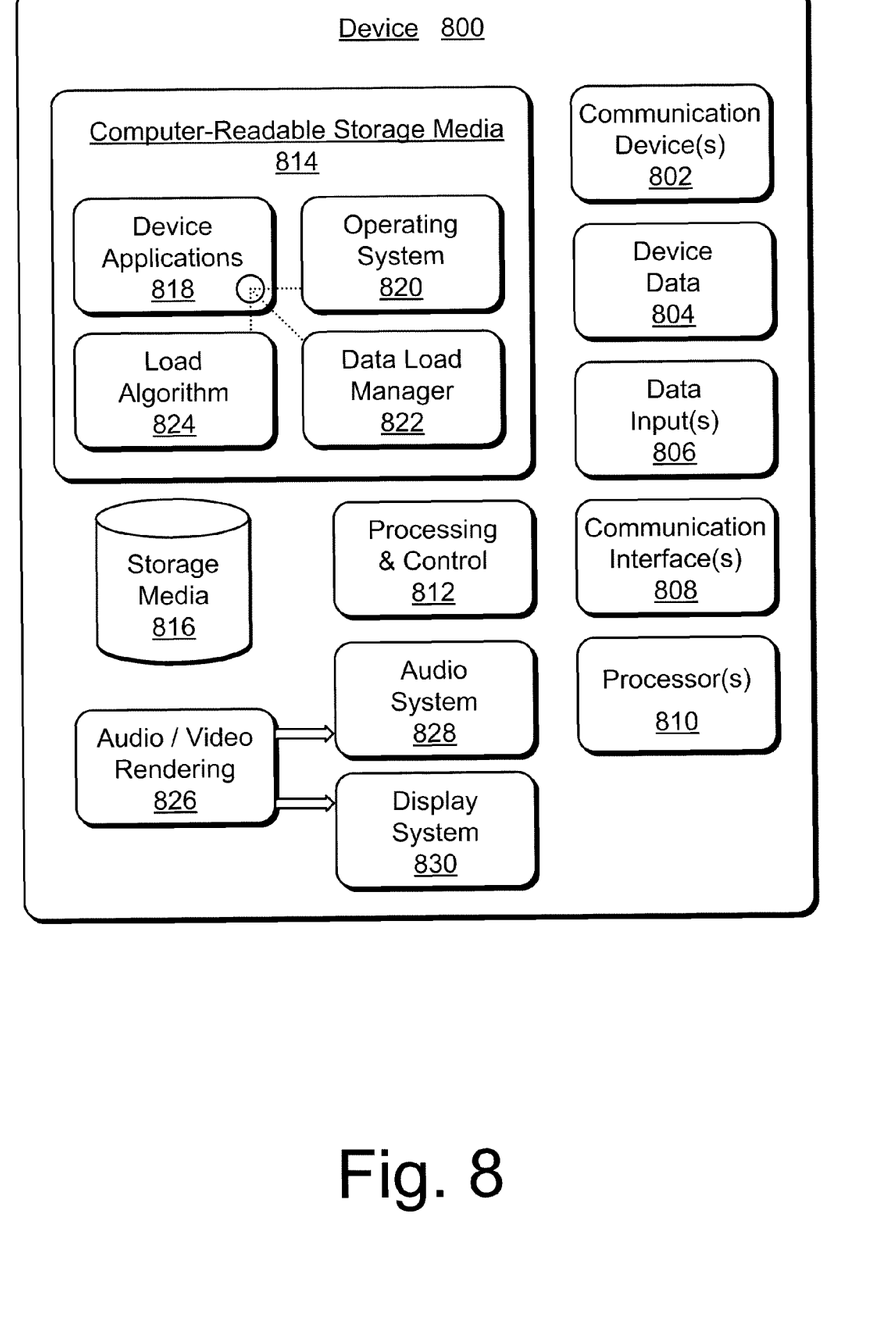
FIG. 8 illustrates various components of an example device that can implement embodiments of media content improved playback quality.

FIG. 8 illustrates various components of an example device 800 that can be implemented as any type of media content playback system and/or computing device as described with reference to the previous FIGS. 1-6 to implement embodiments of media content improved playback quality. In embodiments, device 800 can be implemented as any one or combination of a wired and/or wireless device, as any form of television client device (e.g., television set-top box, digital video recorder (DVR), etc.), consumer device, computer device, server device, portable computer device, user device, communication device, video processing and/or rendering device, appliance device, gaming device, electronic device, and/or as any other type of device. Device 800 may also be associated with a user (i.e., a person) and/or an entity that operates the device such that a device describes logical devices that include users, software, firmware, and/or a combination of devices.

Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable instructions to control the operation of device 800 and to implement embodiments of media content improved playback quality. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable storage media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable storage media 814 provides data storage mechanisms to store the device data 804, as well as various device applications 818 and any other types of information and/or data related to operational aspects of device 800. For example, an operating system 820 can be maintained as a computer application with the computer-readable storage media 814 and executed on processors 810. The device applications 818 can include a device manager (e.g., a control application, software application, signal processing and control module, code that is native to a particular device, a hardware abstraction layer for a particular device, etc.).

The device applications 818 also include any system components or modules to implement embodiments of media content improved playback quality. In this example, the device applications 818 can include a data load manager 822 and a load algorithm 824, such as when device 800 is implemented as a media content playback device or system. The data load manager 822 and the load algorithm 824 are shown as software modules and/or computer applications. Alternatively or in addition, the data load manager 822 and the load algorithm 824 can be implemented as hardware, software, firmware, or any combination thereof.

Device 800 also includes an audio and/or video rendering system 826 that generates and provides audio data to an audio system 828 and/or generates and provides display data to a display system 830. The audio system 828 and/or the display system 830 can include any devices that process, display, and/or otherwise render audio, display, and image data. Display data and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

Although embodiments of media content improved playback quality have been described in language specific to features and/or methods, it is to be understood that the subject of the appended claims is not necessarily limited to the specific features or methods described. Rather, the specific features and methods are disclosed as example implementations of media content improved playback quality.

The invention claimed is:

1. A media content playback system, comprising:
a data load manager configured to:
project when one or more content navigation inputs will be received that cause non-linear playback of a media asset;
estimate, for each segment of the media asset, when each segment will be played back based on the projected one or more content navigation inputs;
determine a next segment of the media asset to download and store based on the estimates of when each segment will be played back and a target playback quality of each segment of the media asset, the target playback quality corresponding to a visual quality when the media asset is played back for viewing;
determine which of the segments of the media asset to preload to improve the target playback quality of the segments based on load models that are generated for each segment of the media asset, a load model including an improvement value by which each of the segments are ranked to determine a next best segment to download; and
a memory device configured to store the segments of the media asset when the segments are preloaded, the segments stored as non-consecutive data that correlates to at least some of the media asset when the segments are downloaded from one or more media content sources.

2. A media content playback system as recited in claim 1, wherein the data load manager is further configured to determine the next segment of the media asset to download based on the segments of the media asset that are subject to bandwidth constraints.

3. A media content playback system as recited in claim 2, wherein the bandwidth constraints prevent the segments of the media asset to be downloaded at the target playback quality.

4. A media content playback system as recited in claim 2, wherein the segments of the media asset that are subject to the bandwidth constraints include at least one of segments at a beginning of the media asset, or segments of the media asset that are resource intensive to download.

5. A media content playback system as recited in claim 1, wherein the data load manager is further configured to download and overwrite the segments of the media asset stored in the memory device to improve the visual quality of the media asset for playback.

6. A media content playback system as recited in claim 1, wherein the data load manager is further configured to initiate deletion of the segments of the media asset from the memory device that are unlikely to be played back.

7. A media content playback system as recited in claim 1, further comprising at least a memory and a processor that implement a load algorithm of the data load manager, the load algorithm configured to:
estimate, for each segment of the media asset, when each segment will be played back;
determine the next segment of the media asset to download and store;
determine the segments of the media asset to preload prior to playback of the media asset to improve the visual quality of the media asset for playback; and
determine which of the segments of the media asset to delete from the memory device that are unlikely to be played back.

8. A media content playback system as recited in claim 1, wherein the content navigation input includes at least one of a jump advance in the media asset, a fast-forward advance of the media asset, or a change to stop playback of the media asset and start playback of an additional media asset.

9. A computer-implemented method, comprising:
storing in a memory device, segments of a media asset as non-consecutive data that correlates to at least some of the media asset when the segments are downloaded from one or more media content sources;
projecting when a content navigation input will be received that causes non-linear playback of the media asset;
estimating, for each of the segments of the media asset, when each segment will be played back based on the projected content navigation input;
determining a next segment of the media asset to download and store based on the estimating of when each segment will be played back and a target playback quality of each segment of the media asset, the target playback quality corresponding to a visual quality when the media asset is played back for viewing;

downloading the next segment from one or more of the media content sources; and determining which of the segments of the media asset to preload in the memory device to improve the target playback quality of the segments based on load models that are generated for each segment of the media asset, a load model including an improvement value by which each of the segments are ranked to determine a next best segment to download.

10. A computer-implemented method as recited in claim 9, further comprising generating the load models for each of the segments of the media asset.

11. A computer-implemented method as recited in claim 9, further comprising downloading for storage the segments of the media asset that are subject to bandwidth constraints, which prevent the segments of the media asset to be downloaded at the target playback quality.

12. A computer-implemented method as recited in claim 11, wherein the segments of the media asset that are subject to the bandwidth constraints include at least one of segments at a beginning of the media asset, or segments of the media asset that are resource intensive to download.

13. A computer-implemented method as recited in claim 9, further comprising at least one of:

overwriting the segments of the media asset stored in the memory device to improve the visual quality of the media asset for playback; or deleting the segments of the media asset from the memory device that are unlikely to be played back.

14. Computer-readable storage memory devices comprising instructions that are executable and, responsive to executing the instructions, a computer device that is configured for media content playback:

projects when a content navigation input will be received that causes non-linear playback of a media asset;

estimates, for each segment of the media asset, when each segment will be played back based on the projected content navigation input;

determines a next segment of the media asset to download and store based on the estimates of when each segment will be played back and a target playback quality of each segment of the media asset, the target playback quality corresponding to a visual quality when the media asset is played back for viewing;

determines which of the segments of the media asset to preload to improve the target playback quality of the segments based on load models that are generated for each segment of the media asset, a load model including an improvement value by which each of the segments are ranked to determine a next best segment to download; and stores the segments of the media asset in a memory device when the segments are preloaded, the segments of the media asset stored as non-consecutive data that correlates to at least some of the media asset when the segments are downloaded from one or more media content sources.

15. Computer-readable storage memory devices as recited in claim 14, further comprising additional instructions that are executable and, responsive to executing the additional instructions, the computer device at least one of:

generates the load models for each segment of the media asset;

determines the next segment of the media asset to download based on the segments of the media asset that are subject to bandwidth constraints, which prevent the segments of the media asset to be downloaded at the target playback quality;

overwrites the segments of the media asset stored in the memory device to improve the visual quality of the media asset for playback; or determines which of the segments of the media asset to delete from the memory device that are unlikely to be played back.

\* \* \* \* \*